March 19, 1946. H. NAGEL ET AL 2,396,874
PHOTOGRAPHIC CAMERA
Filed Jan. 21, 1943 6 Sheets-Sheet 1

Hugo Nagel
John Lewis Crooks
Inventors

Attorneys

March 19, 1946.  H. NAGEL ET AL  2,396,874
PHOTOGRAPHIC CAMERA
Filed Jan. 21, 1943  6 Sheets-Sheet 2

Hugo Nagel
John Lewis Crooks
Inventors

By
Attorneys

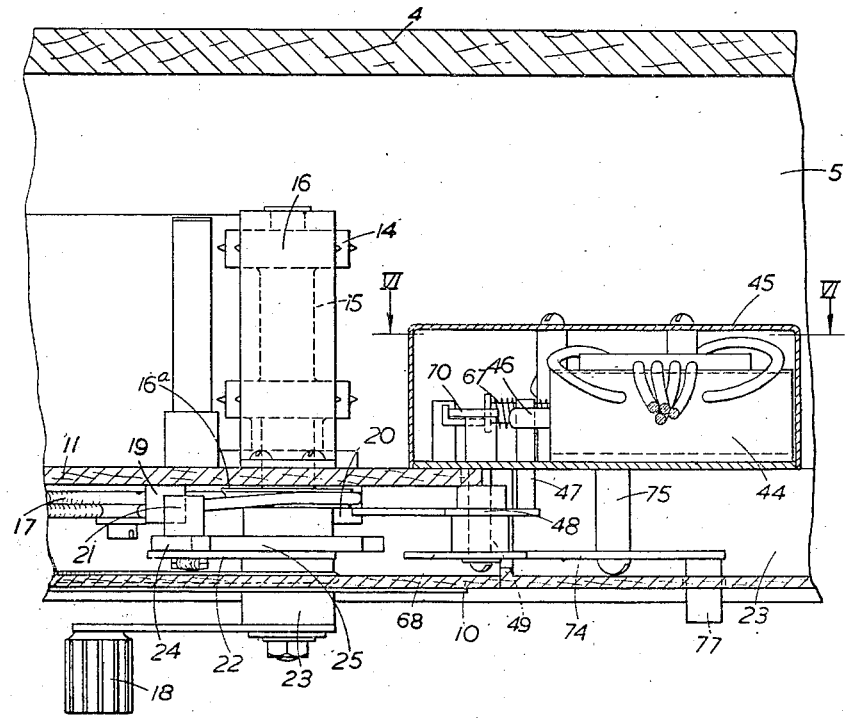
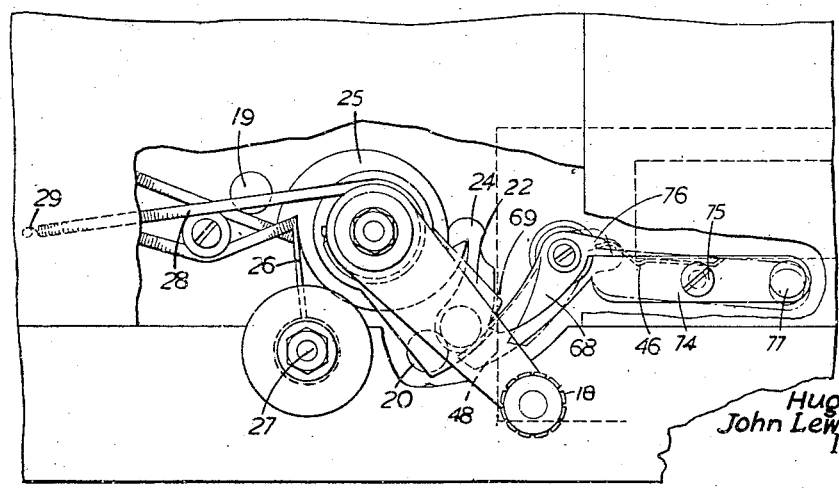

March 19, 1946. H. NAGEL ET AL 2,396,874
PHOTOGRAPHIC CAMERA
Filed Jan. 21, 1943 6 Sheets-Sheet 4
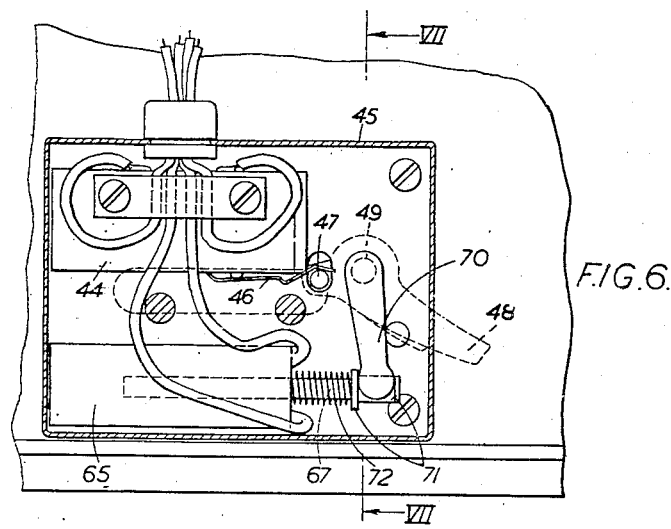
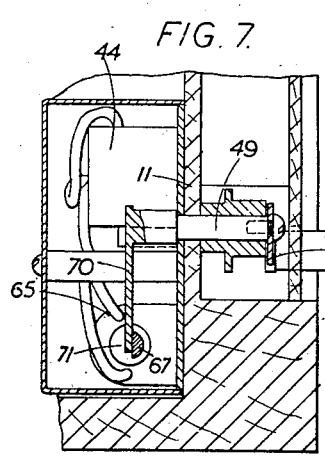
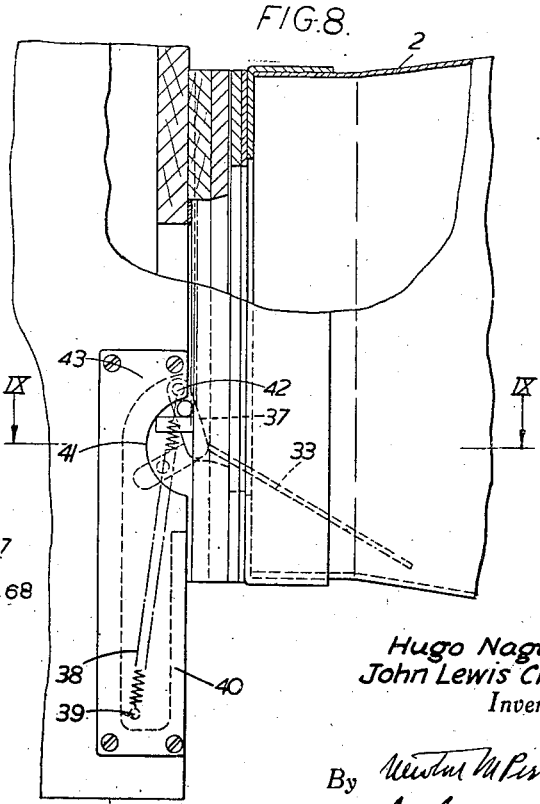
Hugo Nagel
John Lewis Crooks
Inventors March 19, 1946.  H. NAGEL ET AL  2,396,874
PHOTOGRAPHIC CAMERA
Filed Jan. 21, 1943   6 Sheets-Sheet 5
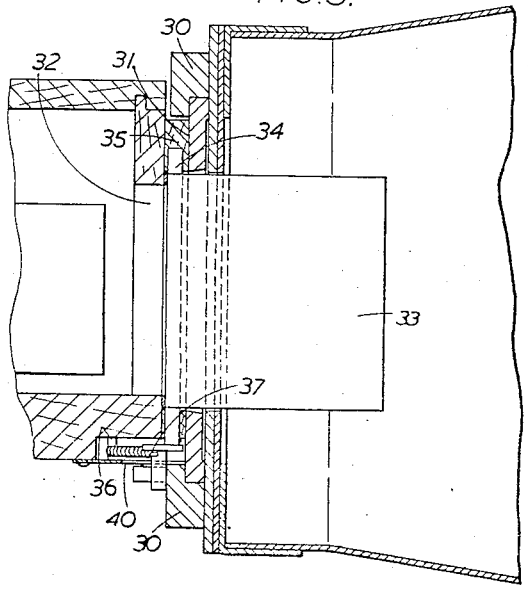
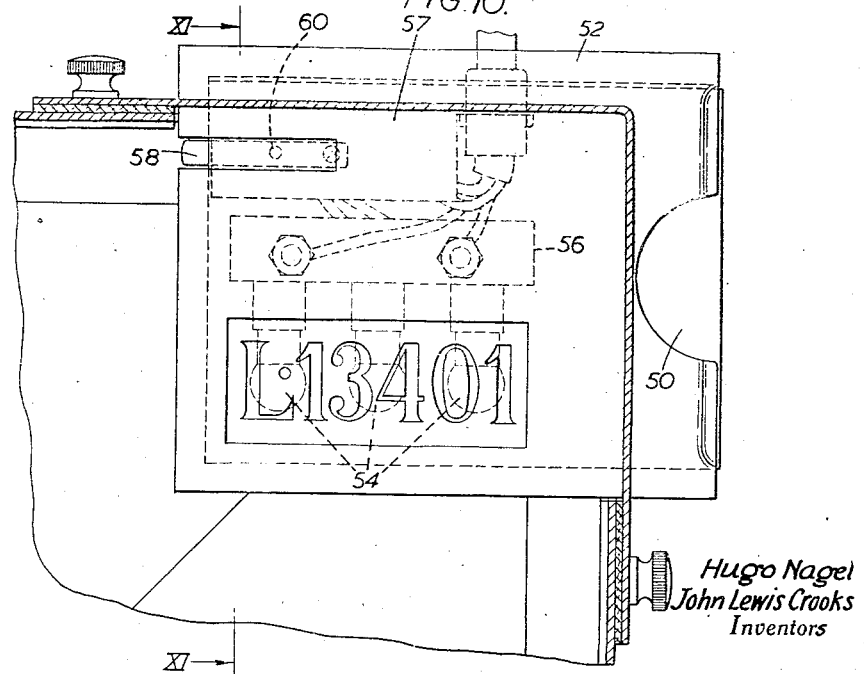
Hugo Nagel
John Lewis Crooks
Inventors

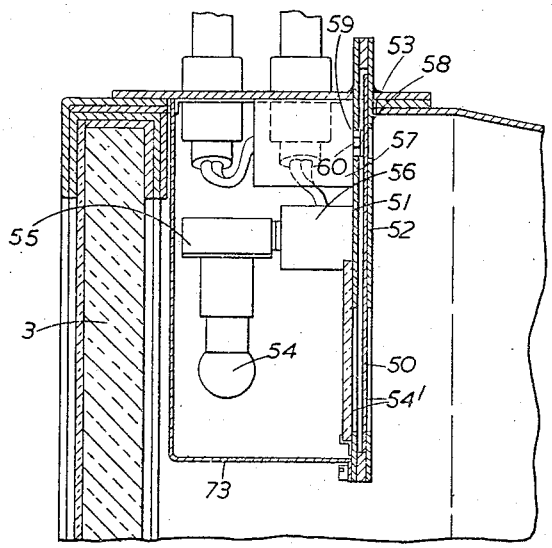
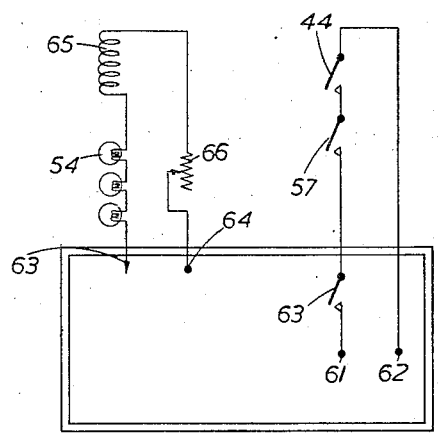

Patented Mar. 19, 1946

2,396,874

UNITED STATES PATENT OFFICE 2,396,874

PHOTOGRAPHIC CAMERA

Hugo Nagel, Wealdstone, and John Lewis Crooks, Kingsway, London W. C. 2, England, assignors to Eastman Kodak Company, Rochester, N. Y., a corporation of New Jersey Application January 21, 1943, Serial No. 473,110
In Great Britain January 22, 1942

2 Claims. (Cl. 250—65)

This invention relates to a photographic camera, particularly though not exclusively, intended for use in photographing an X-ray image formed on a fluorescent screen. Equipment of this kind has been devised to enable preliminary radiographic examination of a large number of persons to be carried out rapidly.

In photographing the X-ray images of successive subjects it is desirable to employ means for preventing multiple exposures on one and the same exposure area. Normally, double exposure prevention devices are provided in cameras under the control of the release mechanism of the camera shutter. It is not possible, however, to employ the known devices in X-ray equipment as above referred to where the exposure is not determined by the opening and closing of a shutter but by the time of operation of the X-ray generating apparatus.

According to the present invention a photographic camera is provided with electric switch means intended for connection with electrical exposure controlling means and adapted to be operated to close a circuit, including said means, by the manual operation of film forwarding means, the switch closing means being held against return movement at the end of the film feeding operation by a latch device which is automatically released, as by the operation of an electro-magnetic device, simultaneously with or after operation of the exposure controlling means.

In carrying the invention into effect according to one form, the camera is applied to one end of a dark tunnel, the other end of which is provided with a fluorescent screen. The camera switch means is connected with the X-ray generating apparatus and is adapted to be closed in the operation of advancing the film through the camera. This arrangement is provided so that if the operator fails to advance the film, the X-ray generating apparatus cannot function. The electro-magnetic device which effects release of the latch device for the switch closing means is rendered operative by the operation of the X-ray apparatus. It will thus be understood that the double exposure prevention means according to this form of the present invention is an attribute of the camera and the X-ray generating apparatus.

In the accompanying drawings—

Fig. 4 is a sectional plan view on the line IV—IV, Fig. 3;

Fig. 5 is a view similar to Fig. 3 but with the parts in different positions;

Fig. 6 is a side elevation of a camera switch and a solenoid for releasing a film winding latch device;

Fig. 7 is a side sectional elevation on the line VII—VII, Fig. 6;

Fig. 8 is a side elevation, partly in section, of means, associated with the camera and the end of the tunnel to which it is applied, for opening the camera shutter;

Fig. 9 is a sectional plan view on the line IX—IX, Fig. 8;

Fig. 10 is a fragmentary view showing in elevation a holder for an identification panel and the relation thereto of illuminating lamps and a switch therefor;

Fig. 11 is a side sectional elevation on the line XI—XI, Fig. 10;

Fig. 12 is a diagram of electrical connections.

Figure 1:
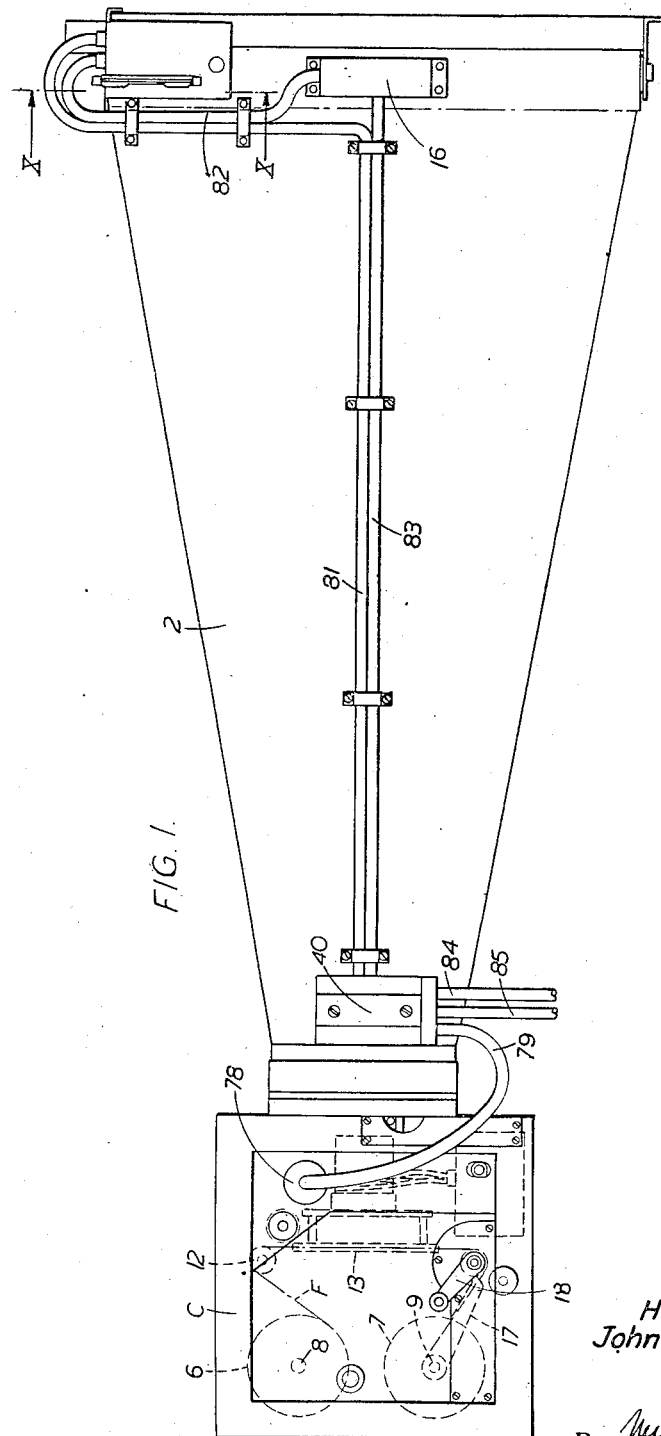
Fig. 1 is a side elevation of a camera according to the present invention applied to a dark tunnel provided with a fluorescent screen.
Figure 2:
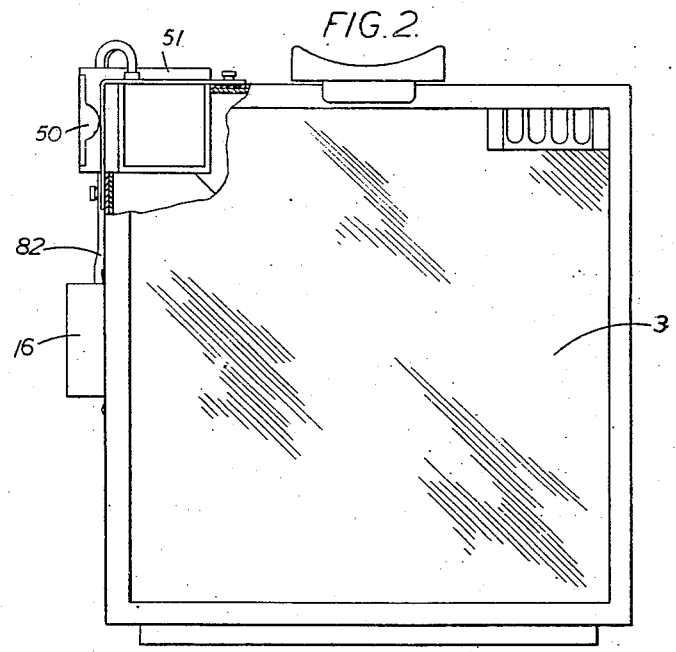
Fig. 2 is a front elevation, on an enlarged scale, of the fluorescent screen end of the tunnel.

A camera C is mounted at one end of a dark tunnel 2, Fig. 1, at the other end of which is mounted a fluorescent screen 3, Fig. 2, on which an X-ray image of a person positioned in front of the screen may be formed for photographing by the camera. The tunnel is made of sheet metal and is in the form of a square section cone. The camera comprises a rectangular casing, one wall 4 of which is hinged to provide access to a compartment 5 within which supply and take-up reels 6, 7, respectively are rotatably mounted on spindles 8, 9. The wall 10 of the camera case opposite wall 4 is removable to provide access to internal mechanisms separated from the compartment 5 by a partition 11.

The film F from the supply reel 6 is guided over a roller 12, Fig. 1, to pass between plate members of a film gate 13 and then over a sprocket wheel 14 rotatably mounted on a shaft 15 which is supported from the mechanism plate 11 by a bracket 16, Fig. 4.

The sprocket wheel 14 engages the marginal perforations of the film which in the example is 35 mm. film. From the sprocket wheel the film passes to the take-up reel 7, the spindle 9 for which is driven from the sprocket shaft 15 through the medium of a pulley 16a secured to the shaft and connected by a crossed driving belt 17 to a pulley on the spindle 9. The shaft 15 is extended through the partition 11 and through an aperture in the removable camera wall 10 and is operable by a crank handle 18 connected to a collar 23 loosely mounted on the shaft. A plate 22 is also connected to the collar and carries a stud 21. The handle is movable through an angle of 180° from the position illustrated in Fig. 3 to the position illustrated in Fig. 5. The movement of the handle is limited by engagement of the stud 21 with stop pins 19 and 20 fixed to the partition 11.

Figure 3:
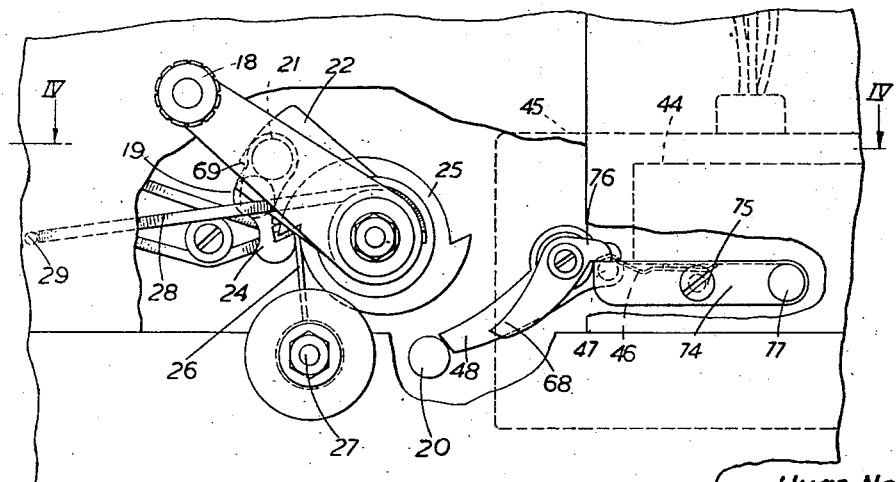
Fig. 3 is a side elevation of part of the film advancing mechanism of the camera.

The stud 21 serves as a pivot for a pawl 24 which is adapted to engage a double-toothed ratchet member 25 secured to the sprocket shaft 15 adjacent the plate 22. As illustrated in Fig. 3, the pawl 24 is engaged under one tooth of the ratchet member, the other tooth of which is disposed diametrically opposite thereto. A spring latch plate 26 rotatably mounted on a shaft 27 engages the tooth of the ratchet member positioned adjacent the pawl and serves to prevent anti-clockwise rotation of the ratchet member.

The construction so far described is such that when the handle 18 is turned through 180° from the Fig. 3 to the Fig. 5 position the ratchet wheel 25 is rotated, and therefore the sprocket wheel 14, to advance the film F through the film gate a distance equal to one picture frame.

In the example illustrated, the exposure is determined by the time the fluorescent screen 3 is excited by X-rays from an X-ray generator set. Consequently, it is convenient to have the camera shutter permanently open when the camera is applied to the small end of the tunnel 2. As illustrated in Figs. 8, 9, this end of the tunnel carries rabbeted vertical guides 30 to receive similar shaped members 31 carried by the front wall of the camera C which has an exposure aperture 32. This aperture is closed by a shutter or flap 33 when the camera is removed from the tunnel. The flap is mounted on a rod 34 rotatably mounted in oppositely disposed plates 35 secured to the front wall of the camera. The camera side wall provided with the removable panel 10 is recessed at 36 to accommodate a lever 37. A tension spring 38 is anchored at one end to the free end of the lever 37 and at the other end to a stud 39 secured to the camera wall at the lower end of the recess 36. As the camera is slid downwardly into the guides 30 a stud 42 carried by the lever 37 contacts a fixed stud 43 extending rearwardly from the adjacent guide 30. This results in the lever 37 moving from the lower to the upper position, Fig. 8, against the action of the spring 38, thereby lowering the flap 33 away from the exposure aperture 32. From inspection of Fig. 9 it will be seen that the aperture 32 is in alignment with apertures provided in members 31, 35, and in the adjacent end wall of the tunnel 2. When the camera is being removed from the tunnel the spring 38 returns the shutter to the closed position.

According to the present invention the camera is provided with means for preventing operation of electrical control means for effecting an exposure unless the film has been advanced to bring a new exposure area into position, thus ensuring that multiple exposures cannot be made on one and the same image area. To achieve this result an electric switch is provided in the camera and is adapted to be closed when the handle 18 is moved into the position indicated in Fig. 5.

In the example illustrated, a switch 44 known commercially as a micro-switch, i. e. one which requires the application of a slight pressure to operate it, is carried in the camera compartment 5 within a casing 45 secured to the partition 11. The switch arm 46 is at its free end adjacent a long pin 47 secured to the rear end of a pawl 48 freely rotatable on a shaft 49 which is itself rotatably mounted in the partition 11. As the handle approaches the Fig. 5 position, the stud 21 carried by the plate 22 engages the upper edge of the pawl 48 and rocks it in the anti-clockwise direction, whereby the pin 47 is moved upwardly to press the switch arm 46 to the closed position. The pawl 68 engages a notch 69 in the plate 22 and holds the handle 18 against back rotation.

In the example illustrated, the switch is connected in circuit with an X-ray generating apparatus, for example, of a known type in which the X-ray tube is loaded by the discharge of electric condensers. It is unnecessary herein to describe in detail how the condensers are charged. In operation, the operator presses a thumb switch until a meter indicates that the condensers are fully charged. Upon releasing the thumb switch certain relays in the set are activated and the potential of the condensers is impressed across the X-ray tube causing it to emit X-rays for about $1/15$ of a second.

It will be understood that unless the circuit of the X-ray generating set is closed by switch 44 in the operation of winding on the film it would not be possible for it to function. The operator would become aware of this, since upon pressing the thumb switch the charging meter would not give a reading.

In addition to providing a camera switch as hereinbefore described it is preferable, though not essential, to prevent operation of the X-ray generating set unless a patient's identification panel is positioned adjacent the fluorescent screen. As illustrated in Figs. 10 and 11, an identification panel in the form of a stiff card 50 having certain particulars printed thereon is mounted at one corner of the dark tunnel 2 a slight distance behind the fluorescent screen 3. The camera lens has sufficient depth of field to accommodate the spacing of the panel from the screen. The panel 50 is slid between receiving plates 51, 52 extending downwardly from a plate 53 supported on the top of the tunnel 2. The opposing faces of the plates 51, 52, are provided at their edges with felt to serve as a light seal. The plates 51, 52 are formed with rectangular apertures 54 with which the patient's identification number on the panel 50 registers. The identification number may comprise opaque letters on the panel which is otherwise transparent or translucent.

It will be understood that when the fluorescent screen 3 is excited by the X-rays, the image of the patient formed on the screen is photographed by the camera together with the identification number on the panel 50. Sufficient illumination of the panel 50 may be provided by the light from the screen but preferably the panel 50 is illuminated by lamps 54 disposed in an internally whitened casing 73 between the fluorescent screen 3 and the panel, such casing preventing light from the lamps reaching the screen. The lamps 54 are screwed into a plug 55 which is connected with a terminal block 56 secured to the plate 51. The terminal block is electrically connected to a micro-switch 57 mounted behind the panel-receiving plate 51, through an aperture 59 of which the switch-operating spring 58 extends. Prior to insertion of the panel 50 the switch spring 58 is disposed in the path of movement of the panel. When this is slid sideways into its holder the leading edge of the panel sweeps across the spring 58 and presses it into contact with the switch pin 60, thus closing the switch. The switch 57 is connected in series with the camera micro-switch 44. It will be understood, therefore, that provided the identification panel 50 has been inserted and the camera switch closed by the operation of winding on the film, the X-ray generating set can be operated to excite the fluorescent screen.

As above mentioned the particular X-ray generating set with which the present embodiment of invention is employed involves the charging and discharging of condensers. The X-ray set may be regarded as comprising two circuits, a charging circuit and a release circuit, as indicated diagrammatically in Fig. 12. In this figure, a thumb switch 63, the micro-switch 57 for the identification panel and the micro switch 44 for the camera are connected in series with terminals 61, 62, connected to condensers, not shown. The release circuit includes a release relay, not shown, connected with terminals 63, 64. The lamps 54 behind the panel 50, a solenoid 65, and an adjustable resistance 66, to be hereinafter referred to, are connected in series with the terminals 63, 64.

When the operator closes the thumb switch 63, the condensers are charged providing both micro-switches 44, 57, have been closed. The discharge of the condensers is effected through the X-ray tube, not shown, and the emitted X-rays cause the fluorescent screen to be excited. Thereafter the relay connected with terminals 63, 64, is operated and, with appropriate adjustment of resistance 66 sufficient current flows to illuminate the lamps 54 and to energize the solenoid 65.

The solenoid 65 is mounted in the camera below the micro-switch 44 and the adjustable resistance 66 is mounted on the dark tunnel 2 at the front end thereof. The solenoid plunger 67 Figs. 4, 6 and 7, is operatively connected with means for releasing the pawl 68 which engages the notch 69 in the plate 22 and holds the handle 18 in the Fig. 5 position at the end of a film winding movement. The end of the shaft 49 remote from the latch pawl 68 carries an arm 70 which is positioned at its free end between lugs 71 formed on the outer end of the solenoid plunger 67. A spring 72 surrounds the solenoid plunger between the solenoid and the rear lug 71 and normally extends the plunger and holds the pawl 68 in the path of movement of the notched end of plate 22. Upon operation of the release relay in the X-ray set, the solenoid operates to suck the plunger 67 inwards, thereby swinging the arm 70 in a clockwise direction as viewed in Fig. 6. The shaft 49 is similarly turned, thereby disengaging the pawl 68 from the notch 69. The film winding handle 18 is thus freed and is returned to the Fig. 3 position under the action of spring 28 anchored at one end to the collar 23 and at the other end to a stud 29 fixed to the partition 11. In this movement the pawl 24 slips over the periphery of the ratchet member 25 and engages under the tooth thereof adjacent the catch plate 26. The pawl 48, becoming free, permits the spring arm 46 to open the micro-switch 44.

It will now be understood that the condensers of the X-ray set cannot be charged by operation of the thumb switch 63. A new area of film must first be fed through the film gate into exposure position. Before making a further exposure the operator removes the panel 50 and replaces it by another identification panel corresponding to the next subject to be photographed.

It will be apparent that if any of the filaments of the lamps 54 break, the solenoid cannot be operated and therefore the film winding handle will not return to the Fig. 3 position. The operator thus becomes aware of the defect. To facilitate renewal of any broken lamps, the plate 53 is disconnected from the tunnel and the panel holder, micro-switch 57 and other parts carried by the casing 73 may be removed from the dark tunnel as a unit. The casing 73 may then be removed to give access to the lamps 54.

It may be necessary to advance the film through the film gate for more than one picture length at a time without it being necessary to operate the X-ray generating set. The present embodiment, therefore, includes means for moving the latching pawl 68 to an inoperative position where it is incapable of engagement with the notch 69. In the example illustrated, such means comprises a lever 74 pivoted intermediate its ends on a stud 75 mounted adjacent the pawl 68. One end of the lever 74 is positioned below a rearward extension 76 of the pawl 68, Fig. 3, the other end of the lever being provided with an operating pin 77 projecting through an aperture in the camera panel 10. When the operator depresses the pin 77 the lever 74 turns the pawl 68 in an anti-clockwise direction as viewed in Fig. 3, thereby permitting the handle 18 to return to the Fig. 3 position. Provided the pin 77 is kept depressed, the operator can now oscillate the handle 18 to advance as much film as required through the film gate.

The camera may, in addition to the supply and take-up film reels 6, 7, be provided with a support for a roll of film of relatively short length as disclosed in the specification of our British Patent No. 541,642. When such a short length of film has been exposed it is desirable to return it to the supply cassette mounted on the support. This may be effected in the manner described in our previous specification after the latch plate 26 has been rotated on its shaft 27 clear of the teeth of the ratchet member 25.

The electrical connections from the solenoid 65 and micro-switch 44 in the box 45 are connected to a four pin plug 78 which is removably plugged into a socket in the camera wall adjacent panel 10. This plug is connected by a cable 79 with a terminal block 80 secured to the rear end of the tunnel 2. Leads from this terminal block are carried by a cable 81 to the micro-switch 57 in the panel box 73. Another cable 82 connects the flashlamp terminal block 56 with the resistance 66 which in turn is connected by a cable 83 with the terminal block 80. A further cable 84 is connected to the thumb-operating switch 63 of the X-ray set and another cable 85 to the relay thereof.

Although the invention has been hereinbefore described as employing an X-ray generating set of the condenser discharge type, it is to be understood that other types of X-ray apparatus press button control for the X-ray exposure may be employed.

Although in the example hereinbefore described, the exposure is effected by the operation of an X-ray apparatus to which the camera switch is connected, it is to be understood that a different form of electrically operated control means for effecting exposure may be employed. For example, the camera may be applied to a photographic copying apparatus which may take the form of a camera and an illuminated copy holder. For instance, in the foregoing example the fluorescent screen may be replaced by a holder for an X-ray negative which receives illumination as from electric lamps provided in a housing mounted behind the holder. The exposure in such a case may be controlled by a time switch which determines the duration of the time of illumination. In applying the invention to this form of copying apparatus with or without an identification panel, the camera switch and, if provided the panel switch, are connected in circuit with the time switch such that unless the film has been forwarded the circuit cannot be completed. Upon completion of the circuit by the closure of the camera switch as above described, the time switch is able to function to effect the exposure and could be arranged simultaneously to disengage the latch for the film winding handle. This ensures that multiple exposures of X-ray negatives cannot be effected on one and the same exposure area.

Instead of controlling the camera flap or shutter by the mounting of the camera on to the tunnel, the flap may be automatically opened through connections operated when the fluorescent screen or negative holder is fitted at the remote end of the tunnel.

Having thus described our invention, what we claim as new and desire to secure by Letters Patent of the United States is:

1. A device for photographing an X-ray image formed by an X-ray emission exposure control apparatus comprising, in combination, a control circuit for said apparatus, a dark tunnel, a fluorescent screen positioned at one end of said tunnel and adapted to receive the image formed by said apparatus, a casing removably carried by said tunnel and positioned behind said screen, a holder on said casing for receiving an identification panel, means carried by said casing and controlled by said apparatus for illuminating said panel when said image is formed on said screen, a switch mounted on said casing and arranged in said circuit of said apparatus and adapted to be moved to closed position upon the positioning of said panel in said holder, a camera mounted at the other end of said tunnel, reciprocating means for feeding a film strip through said camera, a second switch adapted to be connected into said circuit and in series with said first switch, means controlled by said feeding means and operative at the end of the film feeding operation for closing said second switch and locking said feeding means; a discharge circuit for said apparatus and a solenoid arranged in the discharge circuit of said apparatus and adapted to trip said last mentioned means upon actuation of said exposure-control mechanism to open said second switch and to release said feeding means, said solenoid being connected in series with said illuminating means whereby upon failure of the latter the solenoid is rendered inoperative.

2. A device for photographing X-ray images formed by an electrically actuated X-ray emission exposure control apparatus comprising, a control circuit for said apparatus in combination, a dark tunnel, a fluorescent screen positioned at one end of said tunnel and adapted to receive the image formed upon operation of said apparatus, a casing positioned behind said screen, a holder on said casing, an identification panel positionable in said holder, a discharge circuit for said apparatus the operation of which is controlled by said control circuit, means for illuminating said panel, a switch arranged in said control circuit and adapted to be closed upon positioning said panel in said holder, a camera positioned at the opposite end of said tunnel, means for feeding a strip of film through said camera, a second switch arranged in said control circuit and in series with said first switch, holding means controlled by said feeding means and operative at the completion of said feeding means for closing said second switch and locking said feeding means against further movement, a third switch positioned in said control circuit and adapted to be closed manually to initiate the operation of said apparatus, said three switches being arranged in series and positioned in the control circuit of said apparatus, and a solenoid arranged in said discharge circuit and in series with said illuminating means and operative upon the discharge of said apparatus to release said holding means to open said second switch and to free said feeding means.

HUGO NAGEL.
JOHN LEWIS CROOKS.